United States Patent
Balsiger et al.

(10) Patent No.: US 12,215,770 B1
(45) Date of Patent: Feb. 4, 2025

(54) STRAIN WAVE GEAR DIFFERENTIAL WITH HIGH GEAR REDUCTION

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 18/390,332

(22) Filed: Dec. 20, 2023

(51) Int. Cl.
   F16H 49/00 (2006.01)
   F16H 35/00 (2006.01)

(52) U.S. Cl.
   CPC ......... F16H 49/001 (2013.01); F16H 35/008 (2013.01); F16H 2049/003 (2013.01)

(58) Field of Classification Search
   CPC . F16H 49/001; F16H 35/008; F16H 2049/003
   USPC ........................................................ 74/640
   See application file for complete search history.

(56) References Cited

U.S. PATENT DOCUMENTS

| | | | |
|---|---|---|---|
| 6,012,347 A | 1/2000 | Hasegawa | |
| 6,155,220 A | 12/2000 | Marriott | |
| 6,701,803 B1 | 3/2004 | Tamai et al. | |
| 9,528,587 B2* | 12/2016 | Balsiger | F16H 49/001 |
| 2015/0075310 A1* | 3/2015 | Lunin | F16H 49/001 74/412 R |
| 2017/0350491 A1* | 12/2017 | Wilkens | B64C 13/341 |
| 2018/0038468 A1* | 2/2018 | Balsiger | F16H 49/001 |

FOREIGN PATENT DOCUMENTS

CN 112855865 A 5/2021

* cited by examiner

Primary Examiner — Ha Dinh Ho
(74) Attorney, Agent, or Firm — CANTOR COLBURN LLP

(57) ABSTRACT

A harmonic drive, having: a ground ring; a first flex spline extending axially from the ground ring; a first input shaft that is radially exterior to the first flex spline, the first input shaft includes a first wave generator that engages the first flex spline; a second flex spline, radially within the first flex spline and rotationally coupled to the first flex spline, a second input shaft that is radially within the second flex spline, the second input shaft includes a second wave generator that engages the second flex spline; an output shaft coupled to the second flex spline, the first flex spline includes a first spline that faces radially inward; the second flex spline includes a second spline that faces radially outward; a circular gear having a third spline that face outwardly and engages the first spline; a fourth spline that faces radially inward and engages the second spline.

20 Claims, 5 Drawing Sheets

US 12,215,770 B1

STRAIN WAVE GEAR DIFFERENTIAL WITH HIGH GEAR REDUCTION

BACKGROUND

The embodiments are directed to harmonic drives and more specifically to a drive configured as a strain wave gear differential with a high gear reduction.

Some actuation systems, such as found in an aircraft to move a control surface, require a dual motor drive, for redundancy, to drive a single output. A differential gear configuration may be utilized to achieve this objective. A relatively small gear reduction can be achieved within the differential gear configuration. However, typically an additional larger reduction gear is required downstream of the differential gear configuration to obtain the desired rotational output of the control surface, requiring additional gear components. The differential gear and downstream reduction gear can add significant weight, volume and failure modes.

BRIEF SUMMARY

Disclosed is a harmonic drive, including: a ground ring; a first flex spline extending axially from the ground ring; a first input shaft that is radially exterior to the first flex spline, wherein the first input shaft includes a first wave generator that engages the first flex spline; a second flex spline, radially within the first flex spline and rotationally coupled to the first flex spline, a second input shaft that is radially within the second flex spline, wherein the second input shaft includes a second wave generator that engages the second flex spline; an output shaft coupled to the second flex spline, wherein: the first flex spline includes a first spline that faces radially inward; the second flex spline includes a second spline that faces radially outward; and the drive further includes a circular gear that includes: a third spline that face outwardly and engages the first spline; and a fourth spline that faces radially inward and engages the second spline.

In addition to one or more of the disclosed aspects of the drive or as an alternate, the first and second input shafts are configured to counter-rotate relative to each other.

In addition to one or more of the disclosed aspects of the drive or as an alternate, the output shaft is configured to counter-rotate relative to the first input shaft and co-rotate relative to the second input shaft.

In addition to one or more of the disclosed aspects of the drive or as an alternate, the drive includes a first wave generator bearing between the first wave generator and the first flex spline; and a second wave generator bearing between the second wave generator and the second flex spline.

In addition to one or more of the disclosed aspects of the drive or as an alternate, the first and second input shafts are configured to rotate separately or simultaneously, and the output shaft is configured to rotate with rotation of either or both of the first and second input shafts.

In addition to one or more of the disclosed aspects of the drive or as an alternate, the splines are axially aligned with each other.

In addition to one or more of the disclosed aspects of the drive or as an alternate, the first spline of the first flex spline defines a first inverted tooth set (IT1); the second spline of the second flex spline defines a first conventional tooth set (CT1); and the third spline of the circular gear defines a second inverted tooth set (IT2) that mesh with the first inverted tooth set (IT1); and the fourth spline of the circular gear defines a second conventional tooth set (CT2) that mesh with the first conventional tooth set (CT1).

In addition to one or more of the disclosed aspects of the drive or as an alternate, when the first input shaft is stationary and the second input shaft rotates, a first output speed (SO1) of the output shaft (SO) is proportional to a speed of the first input shaft (SI1) multiplied by a drive conventional gear ratio (DCGR) of: DCGR=(CT1−CT2)/CT1.

In addition to one or more of the disclosed aspects of the drive or as an alternate, when the first input shaft rotates and the second input shaft is stationary, the second output speed (S02) of the output shaft (SO) is proportional to a drive inverted gear ratio (DIGR) of: DIGR=((IT2−IT1)/IT1)*((CT1−CT2)/CT1)+1)/(CT1−CT2)/CT1).

In addition to one or more of the disclosed aspects of the drive or as an alternate, when the first and second input shafts rotate, a third output speed (SO3) of the output shaft is proportional to a speed summed differential, which is proportional to a differential between SI2 multiplied by DCGR and SI1 multiplied by DIGR.

In addition to one or more of the disclosed aspects of the drive or as an alternate, the first flex spline is a silk-hat shaped flex spline that extends from a forward end to an aft end, and wherein the forward end of the first flex spline defines the ground ring and the aft end of the first flex spline defines the first spline.

In addition to one or more of the disclosed aspects of the drive or as an alternate, the second flex spline is a cup shaped flex spline that extends from a forward end to an aft end, and wherein the forward end of the second flex spline defines the second spline and the aft end of the second flex spline is a radial disk that defines a center aperture.

In addition to one or more of the disclosed aspects of the drive or as an alternate, the first input shaft extends from a forward end to an aft end and has an inner surface and an outer surface; the forward end of the first input shaft is axially adjacent to the ground ring and the aft end of the first input shaft is aft of the aft end of the first flex spline and the second flex spline; and the inner surface of the first input shaft includes an axially intermediate portion that defines the first wave generator.

In addition to one or more of the disclosed aspects of the drive or as an alternate, the drive includes a forward outer bearing disposed against the outer surface of the first input shaft, at the forward end of the first input shaft; and an aft outer bearing against the outer surface of the first input shaft, at the aft end of the first input shaft.

In addition to one or more of the disclosed aspects of the drive or as an alternate, the second input shaft extends from a forward end to an aft end and defines a forward portion, an aft portion and an intermediate portion; the forward portion of the second input shaft extends from the forward end of the second input shaft to the ground ring and defines a solid shaft having a first forward diameter; the intermediate portion of the second input shaft has an intermediate diameter that is greater than the first forward diameter; and the aft portion of the second input shaft has an axial span that is the same as the intermediate portion of the first input shaft and is axially aligned with the intermediate portion of the first input shaft, and wherein the aft portion of the second input shaft has a first aft diameter that is greater than the intermediate diameter, and wherein the aft portion of the second input shaft defines the second wave generator.

In addition to one or more of the disclosed aspects of the drive or as an alternate, the drive includes a forward inner bearing located between the intermediate portion of the second input shaft and the first flex spline.

In addition to one or more of the disclosed aspects of the drive or as an alternate, the second input shaft defines a blind hole that extends forward from the aft end of the second input shaft, along the aft portion and the intermediate portion of the second input shaft; and the blind hole has an aft hole diameter along the aft portion of the second input shaft and a forward hole diameter along the intermediate portion of the second input shaft that is smaller than the aft hole diameter.

In addition to one or more of the disclosed aspects of the drive or as an alternate, the output shaft extends from a forward end to an aft end and defines a forward portion, an aft portion, and flange between the forward portion and the aft portion; the flange has a flange diameter and the flange is connected to the radial disk of the second flex spline, wherein the flange has a flange thickness so that an aft surface of the flange is axially aligned with the aft end of the first input shaft; the aft portion of the output shaft has a second aft diameter that is smaller than the flange diameter; and the forward portion of the output shaft defines a connecting shaft that extends through the center aperture in the second flex spline, into the blind hole in the second input shaft, wherein the forward portion of the output shaft has a second forward diameter that is smaller than the second aft diameter, and the center aperture in the second flex spline is sized for receiving the forward portion of the output shaft.

In addition to one or more of the disclosed aspects of the drive or as an alternate, the drive includes an aft inner bearing disposed in the blind hole of the second input shaft, between the forward portion of the output shaft and the aft portion of the second input shaft.

In addition to one or more of the disclosed aspects of the drive or as an alternate, the drive includes an aft drive bearing surrounding a portion of the aft portion of the output shaft, wherein the aft drive bearing is located against the portion of the output shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
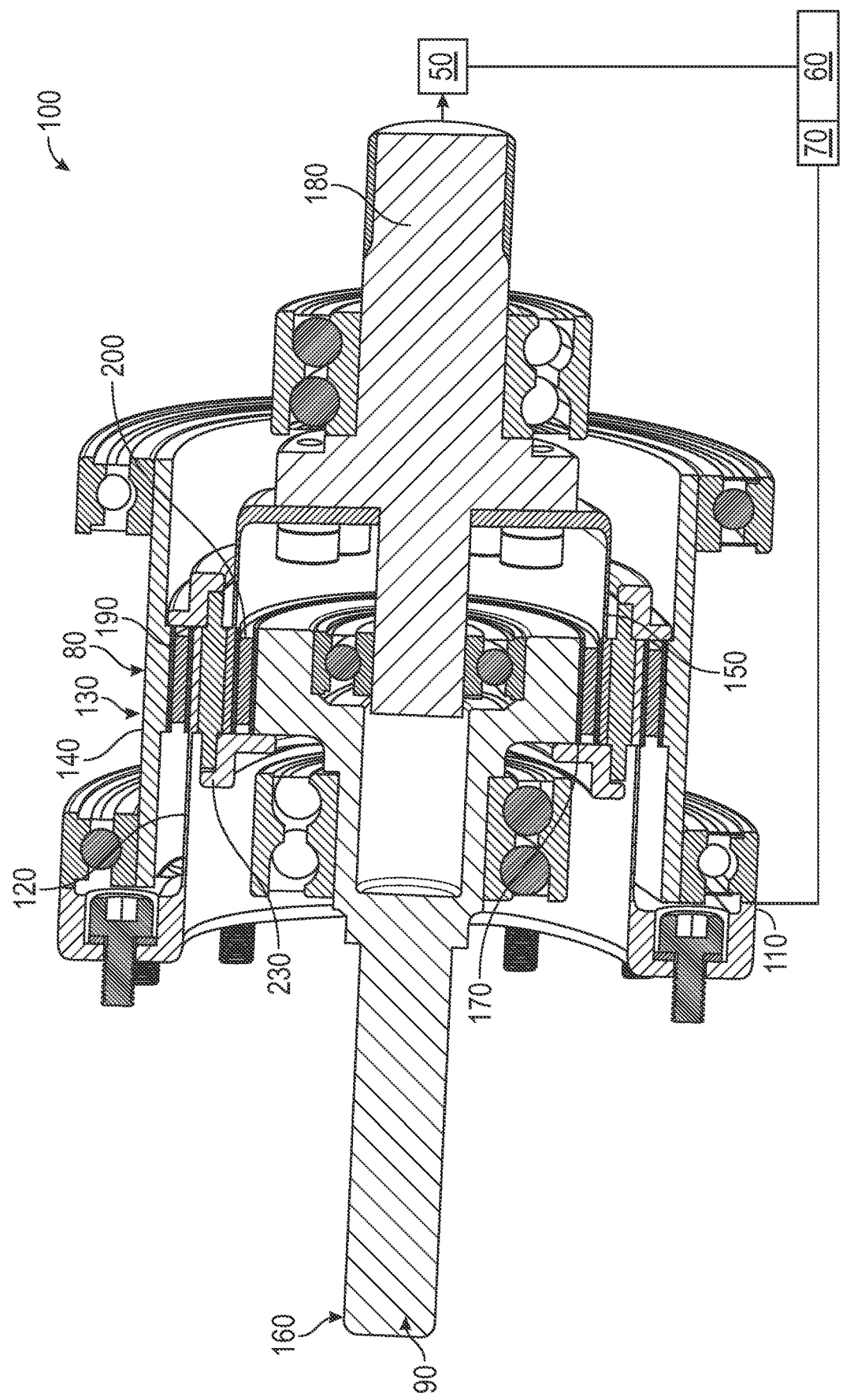
FIG. 1 shows a drive according to an embodiment having multiple input shafts and one output shaft.

Turning to FIG. 1, a harmonic drive 100 is disclosed. As will be disclosed in greater detail below, the drive 100 is configuration with a strain wave gear differential with an inverted strain wave generator 140 and a conventional strain wave generator 170 as input to a shared opposed splined circular gear 230. That is, the drive 100 is a harmonic drive that connects a control surface 50 of an aircraft 60, such a flap, to a stationary structure 70 of the aircraft 60 such as frame member. As indicated below, the drive 100 has redundant motive inputs, i.e., first and second input shafts, 130, 160 for a single output, i.e., an output shaft 180. Each of the input shafts 130, 160 is respectively coupled to first and second motors 80, 90 so that in the event of a complete or partial failure mode of one of the motors 80, 90, the control surface 50 can be operated as required, e.g., during flight.

The drive 100 includes a ground ring 110 that connects to the stationary structure 70. A first flex spline 120 extends axially from (e.g., is coupled to) the ground ring 110. The first input shaft 130 is radially exterior to the first flex spline 120. The first input shaft 130 includes a first wave generator 140 that engages the first flex spline 120. A second flex spline 150 is radially within (interior to) the first flex spline 120 and rotationally coupled to the first flex spline 120. The second input shaft 160 is radially within the second flex spline 120. The second input shaft 160 includes a second wave generator 170 that engages the second flex spline 150.

The output shaft 180 is coupled to the second flex spline 150. The first and second input shafts 130, 160 are configured to rotate separately or simultaneously. The output shaft 180 is configured to rotate with rotation of either or both of the first and second input shafts 130, 160. The first and second input shafts 130, 160 are configured to counter-rotate relative to each other. The output shaft 180 is configured to counter-rotate relative to the first input shaft 130 and co-rotate relative to the second input shaft 160.

A first wave generator bearing 190 is between the first wave generator 140 and the first flex spline 120. A second wave generator bearing 200 is between the second wave generator 170 and the second flex spline 150.

Figure 2:
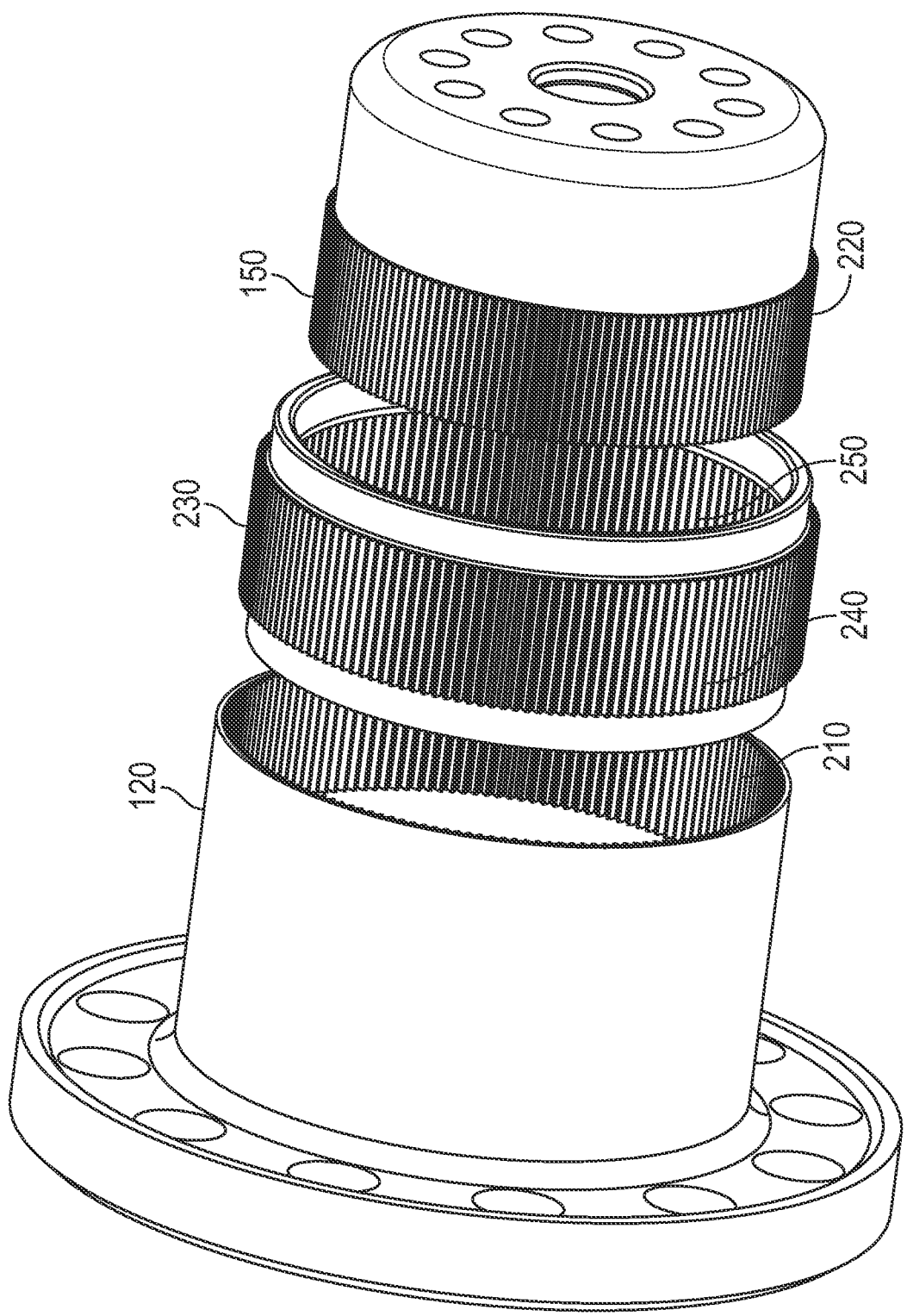
FIG. 2 shows flex splines and a circular gear of the drive.

Turning to FIG. 2, the first flex spline 120 includes a first spline 210 that faces radially inward. The second flex spline 150 includes a second spline 220 that faces radially outward. The circular gear 230 includes a third spline 240 that faces radially outward and engage the first spline 210. The circular gear 230 includes a fourth spline 250 that faces radially inward and engages the second spline 220.

As can be appreciated, the splines 210-250 are axially aligned with each other and has a same axial span as each other. The first spline 210 of the first flex spline 120 defines a first inverted tooth set (IT1). The second flex spline 150 of the second flex spline 150 defines a first conventional tooth set (CT1). The third spline 240 of the circular gear 230 defines a second inverted tooth set (IT2) that meshes with the first inverted tooth set (IT1). The fourth spline 250 of the circular gear 230 defines a second conventional tooth set (CT2) that meshes with the first conventional tooth set (CT1). IT1 and IT2 differ from each other and CT1 and CT2 differ from each other.

Figure 3:
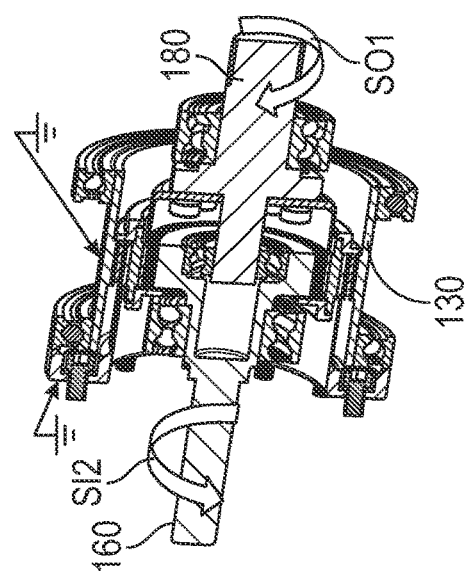
FIG. 3 shows the drive configured so that one of the input shafts is stationary and the other is rotating.

As shown in FIG. 3, when the first input shaft 130 is stationary, e.g., via a motor brake, and the second input shaft 160 rotates at a speed SI2, a first output speed SO1 of the output shaft 180 is proportional to the speed SI2 of the second input shaft 160 multiplied by a drive conventional gear ratio (DCGR), which is defined by:

$$DCGR = (CT1 - CT2)/CT1.$$

Figure 4:
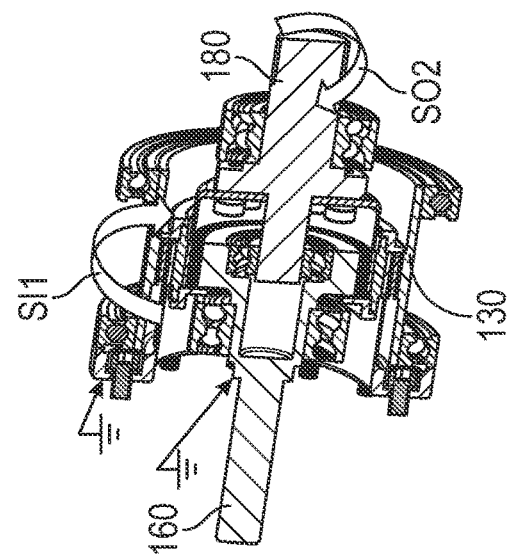
FIG. 4 shows the drive configured so that another one of the input shafts is stationary and the other is rotating.

As shown in FIG. 4, when the first input shaft 130 rotates at a speed SI1, and the second input shaft 160 is stationary, e.g., via a motor brake, a second output speed SO2 of the output shaft 180 is proportional to a speed SI1 of the first input shaft 130 multiplied by a drive inverted gear ratio DIGR, which is defined by:

$$DIGR = ((IT2 - IT1)/IT1) * ((CT1 - CT2)/CT1 + 1)/(CT1 - CT2)/CT1).$$

Figure 5:
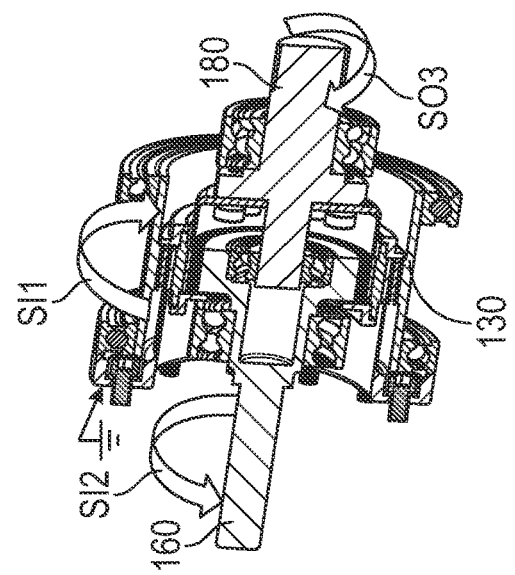
FIG. 5 shows the drive configured so that both of the input shafts are rotating.

As shown in FIG. 5, when the first and second input shafts 130, 160 both rotate, e.g., at respective speeds SI1, SI2, a third output speed SO3 of the output shaft 180 is proportional to a speed summed differential SSD. The speed summed differential SSD is proportional to a difference between SI2 multiplied by DCGR and SI1 multiplied by DIGR. This accounts for a difference between SO1 and SO2 that would result if the brakes were selectively engaged.

That is, in operation, as shown in FIG. 4, the first motor 80 would normally control operation of the first input shaft 130 to drive the output shaft 180 and obtain desired rotational position of the control surface 50. However, if the first motor 80 were to entirely fail, the configuration of FIG. 3 results is executed, such that operation of the second motor 90 drives the second input shaft 160 to provide for rotation of the output shaft 180. If the first motor 80 were to partially fail and either overspeed or under-speed, the configuration of FIG. 5 is executed, with the second motor 90 driving the second input shaft 160 while the first motor 80 drives the first input shaft 130.

Figure 6:
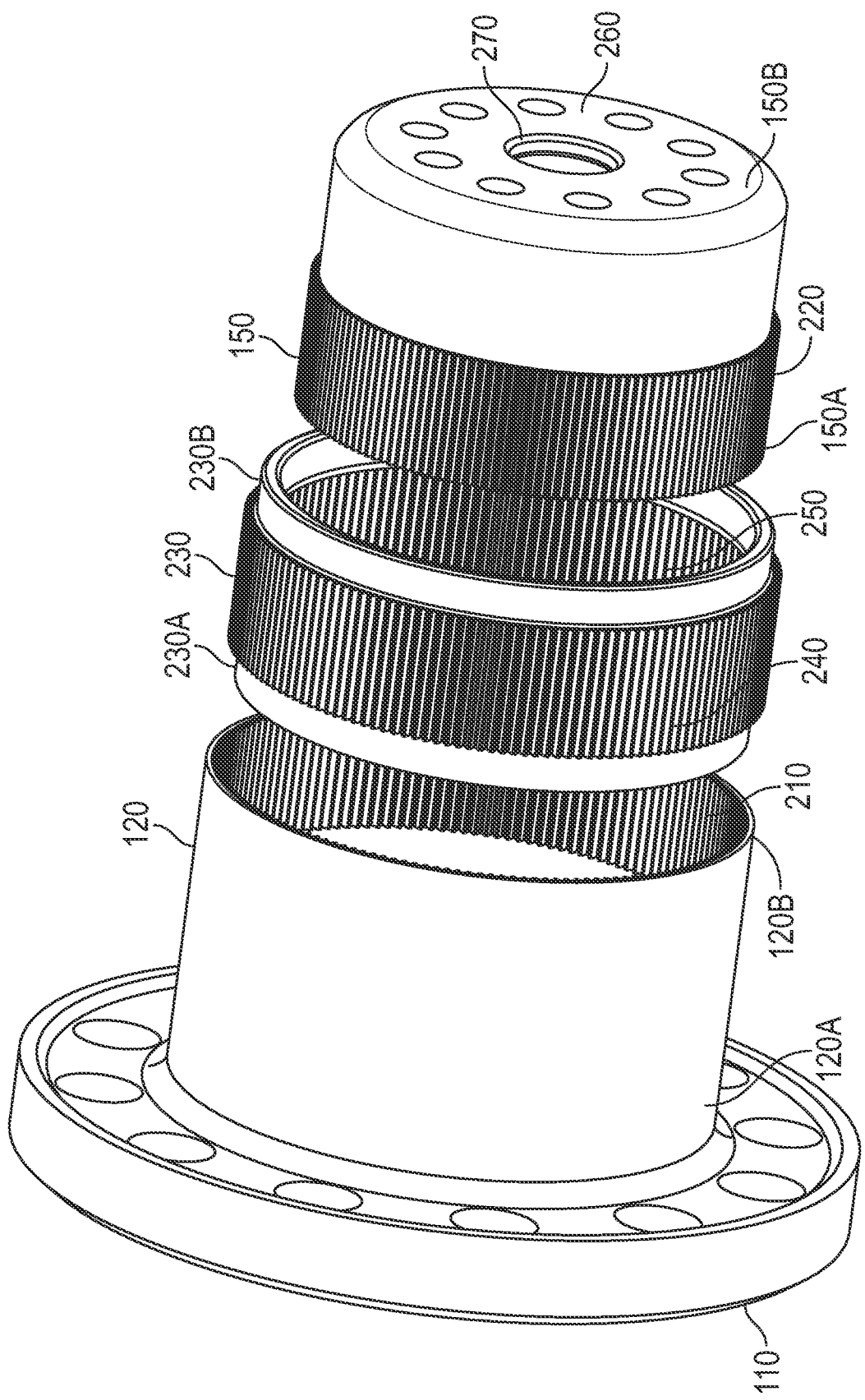
FIG. 6 shows additional features of the flex splines and the circular gear of the drive.

Turning to FIG. 6, the first flex spline 120 is a silk-hat shaped flex spline that extends from a forward end 120A to an aft end 120B. The forward end 120A of the first flex spline 120 defines the ground ring 110 and the aft end 120B of the first flex spline 120 defines the first spline 210. The second flex spline 150 is a cup shaped flex spline that extends from a forward end 150A to an aft end 150B. The forward end 150A of the second flex spline 150 defines the second spline and the aft end of the second flex spline 150 is a radial disk 260 that defines a center aperture 270. The circular gear 230 extends from a forward end 230A to an aft end 230B. The third and fourth splines 240, 250 are axially centered along the circular gear 230.

Figure 7:
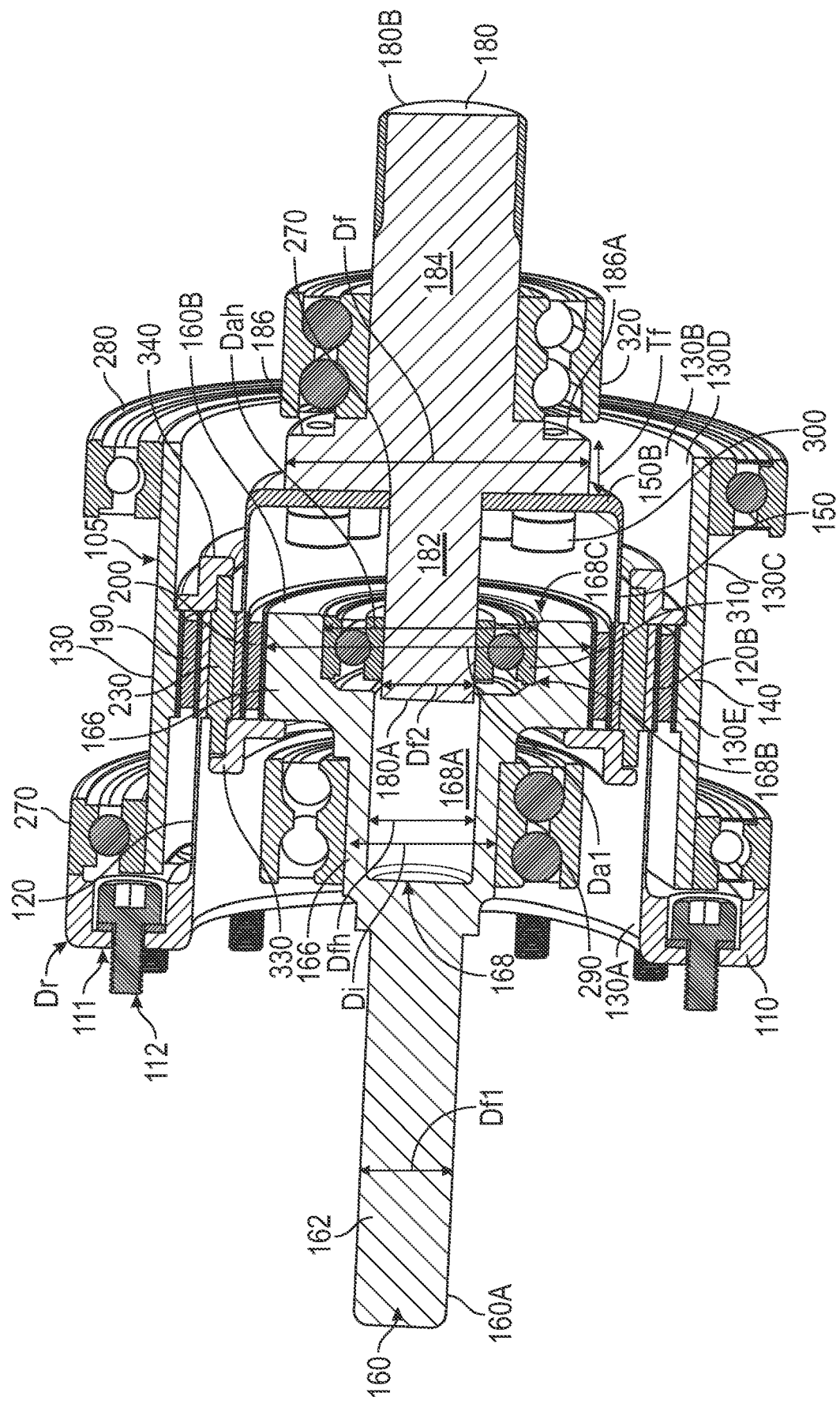
FIG. 7 shows additional features of the drive.

Turning to FIG. 7, the first input shaft 130 extends from a forward end 130A to an aft end 130B and has an outer surface 130C and an inner surface 130D. The forward end 130A of the first input shaft 130 is axially adjacent to the ground ring 110 and the aft end 130B of the first input shaft 130 is aft of the aft end 120B of the first flex spline 120 and the aft end 150B of the second flex spline 150. The inner surface 130D of the first input shaft 130 includes an axially intermediate portion 130E that defines the first wave generator 140.

A forward outer bearing 270 is disposed against the outer surface 130C of the first input shaft 130, at the forward end 130A of the first input shaft 130. An aft outer bearing 280 is disposed against the outer surface 130C of the first input shaft 130, at the aft end 130B of the first input shaft 130.

A ground ring diameter Dr defines an outer diameter of the drive 100, and substantially matches an outer diameter defined by the bearings 270, 280. The first input shaft 130 has a next larger diameter, being slightly smaller than the ground ring and its outer boundary defines a body 105 of the drive 100 from which the second input shaft 160 and the output shaft 180 extend axially. Holes 111 in the ground ring 110 receive fasteners 112 which may be bolts that mount the drive 100 to a stationary structure.

The second input shaft 160 extends from a forward end 160A to an aft end 160B and defines a forward portion 162, an aft portion 164 and an intermediate portion 166 therebetween. The forward portion 162 of the second input shaft 160 extends from the forward end 160A of the second input shaft 160 to the ground ring 110 and defines a solid shaft having a first forward diameter Df1. The intermediate portion 166 of the second input shaft 160 has an intermediate diameter Di that is greater than the first forward diameter Df1. A forward inner bearing 290 is located between the intermediate portion 166 of the second input shaft 160 and the first flex spline 120.

An axial span (length) of the aft portion 164 of the second input shaft 160 is the same as the intermediate portion 130E of the first input shaft 130. The aft portion 164 of the second input shaft 160 is axially aligned with the intermediate portion 130E of the first input shaft 130. A first aft diameter Da1 is defined by the aft portion 164 of the second input shaft 160 that is greater than the intermediate diameter Di. The second wave generator 170 is defined by the aft portion 164 of the second input shaft 160.

The second input shaft 160 defines a blind hole 168 that extends forward from the aft end 160B of the second input shaft 160, along the aft portion 164 and intermediate portion 166 of the second input shaft 160. That is, the blind hole 168 defines a forward portion 168A and an aft portion 168B, where the aft portion 168B defines an aperture 168C of the blind hole 168. The blind hole 168 has an aft hole diameter Dah along the aft portion 164 of the second input shaft 160, i.e., along its aft portion 168B. The blind hole 168 has a forward hole diameter Dfh along the intermediate portion 166 of the second input shaft 160, i.e., along its forward portion 168A, that is smaller than the aft hole diameter Dah.

The output shaft 180 extends from a forward end 180A to an aft end 180B and defines a forward portion 182, an aft portion 184, and flange 186 between the forward portion 182 and the aft portion 184. The flange 186 has a flange diameter Df and the flange 186 is connected to the radial disk 260 of the second flex spline 150, e.g., via fasteners 300 such as bolts. The flange 186 has a flange thickness Tf so that an aft surface 186A of the flange 186 is axially aligned with the aft end 130B of the first input shaft 130.

The aft portion 184 of the output shaft 180 has a second aft diameter Da2 that is smaller than the flange diameter Df. The forward portion 180B of the output shaft 180 defines a connecting shaft that extends through the center aperture 270 in the second spline 220 and into the blind hole 168 in the second input shaft 160. The forward portion 182 of the output shaft 180 has a second forward diameter Df2 that is smaller than the second aft diameter Da2. The center aperture 270 in the second flex spline 150 is sized for receiving the forward portion 182 of the output shaft 180, to pass therethrough.

An aft inner bearing 310 is disposed in the blind hole 168 of the second input shaft 160. The aft inner bearing 310 is located between the forward portion 182 of the output shaft 180 and the aft portion 164 of the second input shaft 160. An aft drive bearing 320 surrounds a portion of the aft portion 184 of the output shaft 180. The aft drive bearing 320 is located against the flange 186 of the output shaft 180.

A forward clip 330 extends along a forward end of circular gear 230, the second flex spline 150, the second wave generator bearing 200 and the aft portion 164 of the second input shaft 160. An aft clip 340 extends along an aft end of the circular gear 230, the first flex spline 120, and the first wave generator bearing 190. The clips maintain the axial alignment of the drive components.

Each of the bearings disclosed above may be a ball bearing.

The disclosed drive 100 provides redundant motive elements, i.e., input shafts, such that a combination of motive input provides a speed sum differential as the output. The drive 100 provides a high gear ratio to a small volume differential. The drive provides fault tolerance, i.e., if a motor connected to the first input shaft 130 fails entirely or partially, a second motor connected to the second input shaft

160 may engage so that an output can be manipulated as required. The drive 100 provides an integrated differential and gear reduction design that optimizes weight, volume, cost, and reliability.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A harmonic drive, comprising:
 a ground ring;
 a first flex spline extending axially from the ground ring;
 a first input shaft that is radially exterior to the first flex spline,
 wherein the first input shaft includes a first wave generator that engages the first flex spline;
 a second flex spline, radially within the first flex spline and rotationally coupled to the first flex spline,
 a second input shaft that is radially within the second flex spline,
 wherein the second input shaft includes a second wave generator that engages the second flex spline;
 an output shaft coupled to the second flex spline,
 wherein:
  the first flex spline includes a first spline that faces radially inward;
  the second flex spline includes a second spline that faces radially outward; and
  the drive further includes a circular gear that includes: a third spline that face outwardly and engages the first spline; and a fourth spline that faces radially inward and engages the second spline.

2. The drive of claim 1, wherein
 the first and second input shafts are configured to counter-rotate relative to each other.

3. The drive of claim 2, wherein
 the output shaft is configured to counter-rotate relative to the first input shaft and co-rotate relative to the second input shaft.

4. The drive of claim 1, including:
 a first wave generator bearing between the first wave generator and the first flex spline; and
 a second wave generator bearing between the second wave generator and the second flex spline.

5. The drive of claim 1, wherein:
 the first and second input shafts are configured to rotate separately or simultaneously, and the output shaft is configured to rotate with rotation of either or both of the first and second input shafts.

6. The drive of claim 1, wherein
 the splines are axially aligned with each other.

7. The drive of claim 1, wherein
 the first spline of the first flex spline defines a first inverted tooth set (IT1);
 the second spline of the second flex spline defines a first conventional tooth set (CT1); and
 the third spline of the circular gear defines a second inverted tooth set (IT2) that mesh with the first inverted tooth set (IT1); and
 the fourth spline of the circular gear defines a second conventional tooth set (CT2) that mesh with the first conventional tooth set (CT1).

8. The drive of claim 7, wherein
 when the first input shaft is stationary and the second input shaft rotates, a first output speed (SO1) of the output shaft (SO) is proportional to a speed of the first input shaft (SI1) multiplied by a drive conventional gear ratio (DCGR) of:

$DCGR=(CT1-CT2)/CT1.$

9. The drive of claim 8, wherein
 when the first input shaft rotates and the second input shaft is stationary, the second output speed (S02) of the output shaft (SO) is proportional to a drive inverted gear ratio (DIGR) of:

$DIGR=((IT2-IT1)/IT1)*((CT1-CT2)/CT1)+1)/(CT1-CT2)/CT1).$

10. The drive of claim 9, wherein
 when the first and second input shafts rotate, a third output speed (SO3) of the output shaft is proportional to a speed summed differential, which is proportional to a differential between SI2 multiplied by DCGR and SI1 multiplied by DIGR.

11. The drive of claim 1, wherein
 the first flex spline is a silk-hat shaped flex spline that extends from a forward end to an aft end, and
 wherein the forward end of the first flex spline defines the ground ring and the aft end of the first flex spline defines the first spline.

12. The drive of claim 11, wherein
 the second flex spline is a cup shaped flex spline that extends from a forward end to an aft end, and
 wherein the forward end of the second flex spline defines the second spline and the aft end of the second flex spline is a radial disk that defines a center aperture.

13. The drive of claim 12, wherein:
 the first input shaft extends from a forward end to an aft end and has an inner surface and an outer surface;
 the forward end of the first input shaft is axially adjacent to the ground ring and the aft end of the first input shaft is aft of the aft end of the first flex spline and the second flex spline; and
 the inner surface of the first input shaft includes an axially intermediate portion that defines the first wave generator.

14. The drive of claim 13, further including:
 a forward outer bearing disposed against the outer surface of the first input shaft, at the forward end of the first input shaft; and
 an aft outer bearing against the outer surface of the first input shaft, at the aft end of the first input shaft.

15. The drive of claim 13, wherein:
the second input shaft extends from a forward end to an aft end and defines a forward portion, an aft portion and an intermediate portion;
the forward portion of the second input shaft extends from the forward end of the second input shaft to the ground ring and defines a solid shaft having a first forward diameter;
the intermediate portion of the second input shaft has an intermediate diameter that is greater than the first forward diameter; and
the aft portion of the second input shaft has an axial span that is the same as the intermediate portion of the first input shaft and is axially aligned with the intermediate portion of the first input shaft, and
wherein the aft portion of the second input shaft has a first aft diameter that is greater than the intermediate diameter, and wherein the aft portion of the second input shaft defines the second wave generator.

16. The drive of claim 15, further comprising
a forward inner bearing located between the intermediate portion of the second input shaft and the first flex spline.

17. The drive of claim 15, wherein:
the second input shaft defines a blind hole that extends forward from the aft end of the second input shaft, along the aft portion and the intermediate portion of the second input shaft; and
the blind hole has an aft hole diameter along the aft portion of the second input shaft and a forward hole diameter along the intermediate portion of the second input shaft that is smaller than the aft hole diameter.

18. The drive of claim 17, wherein:
the output shaft extends from a forward end to an aft end and defines a forward portion, an aft portion, and flange between the forward portion and the aft portion;
the flange has a flange diameter and the flange is connected to the radial disk of the second flex spline, wherein the flange has a flange thickness so that an aft surface of the flange is axially aligned with the aft end of the first input shaft;
the aft portion of the output shaft has a second aft diameter that is smaller than the flange diameter; and
the forward portion of the output shaft defines a connecting shaft that extends through the center aperture in the second flex spline, into the blind hole in the second input shaft,
wherein the forward portion of the output shaft has a second forward diameter that is smaller than the second aft diameter, and
the center aperture in the second flex spline is sized for receiving the forward portion of the output shaft.

19. The drive of claim 18, including
an aft inner bearing disposed in the blind hole of the second input shaft, between the forward portion of the output shaft and the aft portion of the second input shaft.

20. The drive of claim 18, including
an aft drive bearing surrounding a portion of the aft portion of the output shaft, wherein the aft drive bearing is located against the portion of the output shaft.

\* \* \* \* \*